Feb. 6, 1940.  M. E. GOULD  2,189,001
LIGHT-RESPONSIVE COMMUTATOR OR SWITCHBOARD
Filed Nov. 9, 1937   3 Sheets-Sheet 1

Inventor
Merle E. Gould
By
Churn W Hill
Attorney

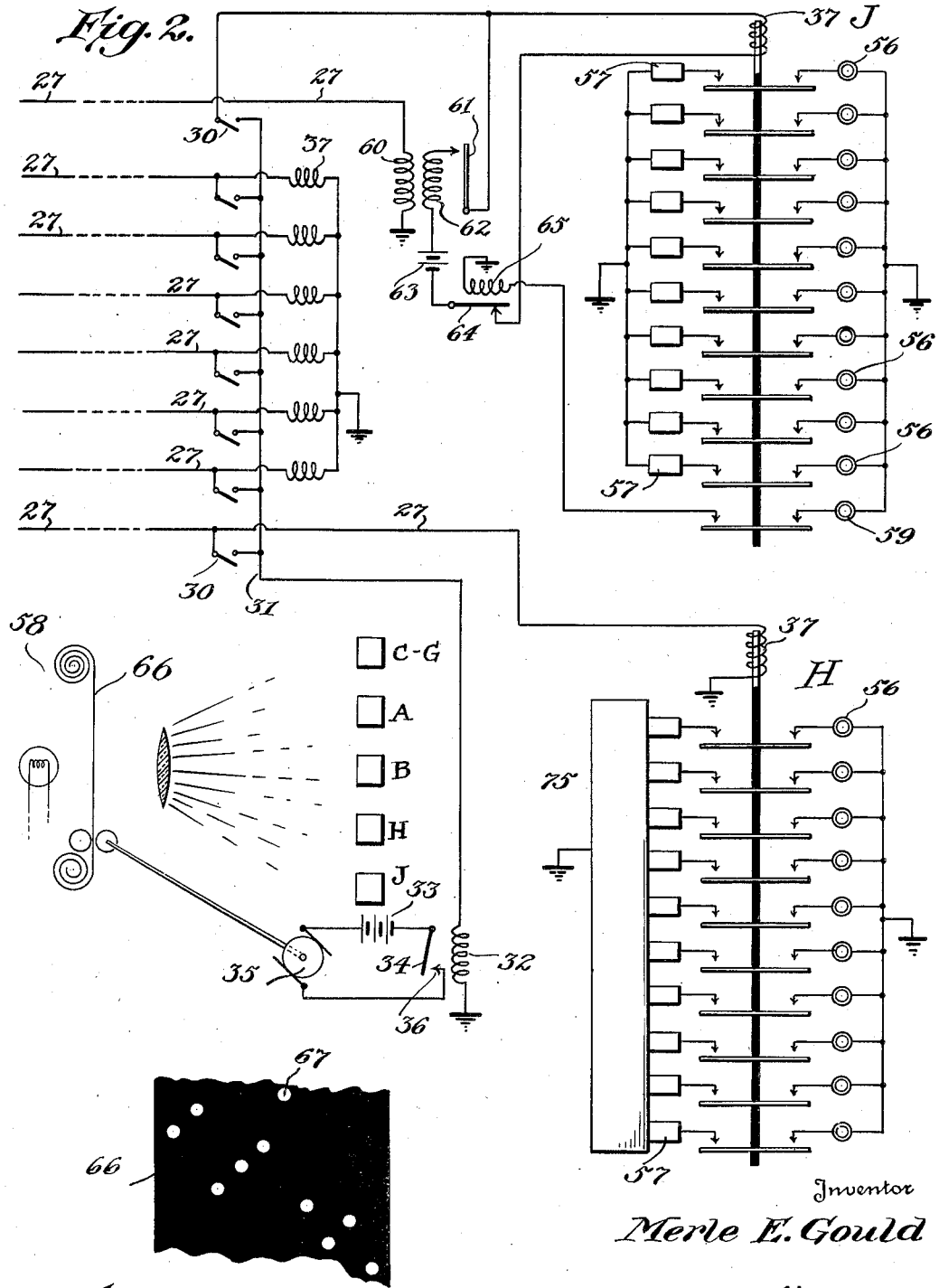

Feb. 6, 1940. M. E. GOULD 2,189,001
LIGHT-RESPONSIVE COMMUTATOR OR SWITCHBOARD
Filed Nov. 9, 1937 3 Sheets-Sheet 3

Inventor
Merle E. Gould
By Charles W. Hills
Attorney

Patented Feb. 6, 1940

2,189,001

UNITED STATES PATENT OFFICE 2,189,001

LIGHT-RESPONSIVE COMMUTATOR OR SWITCHBOARD

Merle E. Gould, White Plains, N. Y., assignor to Photoelectric Business Machines, Inc., Washington, D. C., a corporation of Delaware Application November 9, 1937, Serial No. 173,726

10 Claims. (Cl. 250—41.5)

This invention relates to means for selecting one at a time of a plurality of signalling lines to carry current indicative of certain types or origins of data and further to break up the data into its components for the recording or tabulating of the components.

It is an important object of this invention to provide means whereby a production report, for instance, may be inspected by light-responsive means according to a classified division or subdivision and have its components in this division or subdivision scanned by light-responsive means and recorded.

It is a further object of this invention to provide light-responsive units in coded position and actuable by beams of light in coded position to select one at a time of a group of signalling lines to carry current and be indicative of the coded position of the activated light-responsive units.

It is a further object of this invention to provide light-responsive units in coded position and actuable by beams of light in coded position to energize selectively certain selected current-responsive devices of a plurality of such devices, the current-responsive devices so selected by said light-responsive units being then actuable to condition other devices for actuation by coded light-responsive units actuated by beams of light in coded position.

It is a further object of this invention to provide light-responsive units in coded position and actuable by beams of light in coded position to select one at a time of a group of signalling lines for energization of the selected line, and to provide means for selectively de-energizing the line selected for energization.

It is a further object of this invention to provide light-responsive units in coded position and momentarily actuable by beams of light in coded position to select one at a time of a group of signalling lines for energization of the selected line, and to maintain energization of the selected line for a selected period of time.

It is a further object of this invention to provide light-responsive units in coded position and actuable by beams of light in coded position passing through a film, and to provide means responsive to light to control movement of the film.

It is a further object of this invention to provide light-responsive units in coded position and actuable by beams of light in coded position to energize switches to effect connection of selected current-responsive devices of a plurality of such devices with a source of current, and to provide other light-responsive means actuable to subsequently de-energize said switches.

Other and further important objects and features of this invention will be apparent from the disclosures in the specification and the accompanying drawings.

This invention is illustrated in the drawings and hereinafter more fully described.

In the drawings:

Figure 2 illustrates diagrammatically circuits and instrumentalities cooperable with the circuits and instrumentalities of Figure 1, and with lines shown broken.

Figure 3 is a showing of a portion of a film conditioned to permit the passing of light beams therethrough in coded position.

Figure 1:
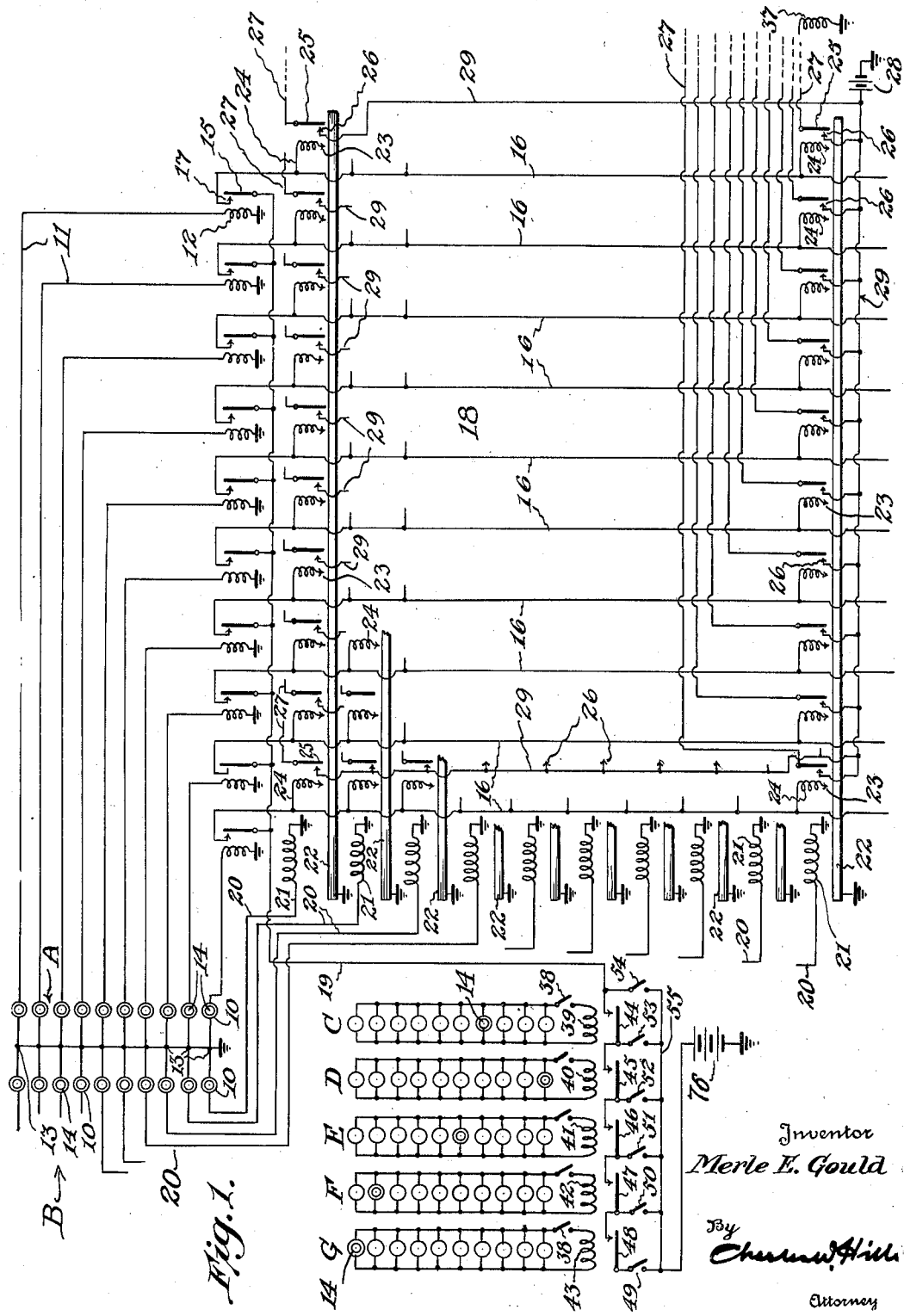
Figure 1 illustrates diagrammatically the circuits and instrumentalities described below, with lines shown broken.

In Figure 1 there is shown diagrammatically a selective switching and distributing system or commutator by means of which a signal from one of a plurality of sources is sent over a selected one of a hundred outgoing or signalling lines at a given instant.

The letter A designates a row of ten sockets of a units column, in any one of which a light-responsive unit may be inserted to represent any one of the digits from zero to nine.

The letter B designates a row of ten sockets of a tens column, in any one of which a light-responsive unit may be inserted to represent any unit of ten from zero to ninety.

Thus, a light-responsive unit in position nine of row A, with another light-responsive unit in position six of row B, would represent the number 69.

Groups or rows, each of ten sockets, and designated by the letters C, D, E, F, and G, respectively, provide for the insertion of a light-responsive unit in a given position in each of the rows.

The light-responsive units are sources of current when activated by light, and may be considered as switches closable to send current over lines to indicate numbers and to qualify the numbers. Thus, if rows A and B alone are used, the numbers indicated may vary between the limits of zero and 99, but if, in addition to rows A and B, one of the rows C, D, E, F, and G is made a controlling factor, the signal transmitted is no longer simply an indication of the position of the light-sensitive units in rows A and B, but is an indication of the position of the units in A and B plus that of the unit in another selected row.

A signal may be transmitted from row A alone, from row B alone, from rows A and B working as a pair, and from rows A and B and one, or a plurality of the rows C, D, E, F, or G working as a group of three or more rows.

From each socket 10 in row A there is a wire 11 connecting the socket with a relay 12, and each socket is also connected to a common ground wire 13. When a light-responsive unit 14 is inserted in a socket 10 in row A, and illuminated, it causes current to flow through a relay 12 individual to that socket to move an armature 15 to circuit closing position. The armature 15 is connected to a source of current 76 through a wire 19, so that movement of the armature to circuit closing position results in the connection of a wire or bus-bar 16 to that source through a contact 17 of the relay. There are as many relays 12 as there are sockets in row A to effect selective connection of a bus-bar 16 in a group of ten such bas-bars indicated generally by the numerals 18 for the group.

It will be obvious that single wires and ground connections in circuit showing is an expedient familiar to those engaged in the electrical art to avoid confusion of lines.

From each socket 10 in row B there is a wire 20 connecting the socket with a relay 21, and each socket is also connected to a common ground wire 13. When a light-responsive unit 14 is inserted in a socket 10 of row B, and illuminated, it causes current to flow through a relay 21 individual to that socket to move an armature 22 to circuit closing position.

The armature is what is conventionally known as a gang switch, and when it moves to circuit closing position it connects each of the ten bus bars 16 of the group 18 to ground through a contact 23 and a relay 24, each wire of the group being provided with a relay 24 and a contact 23. Should one of the bus bars 16 be connected through an armature 15 and the wire 19 to a source of current, then its relay 24 will actuate its armature or line switch 25 to engage a contact 26 to connect an outgoing line 27 to a source of current 28 through a wire 29.

To avoid confusion of lines, not all of the ten gang switches have been fully shown with the cooperating relays 24 and armatures 25 for connecting an outgoing line to the source of current 28, and it will be understood that there are ten gang switches and a hundred relays 24 having contacts 26 to be engaged by the armatures 22 of the gang switches, so that any one of one hundred outgoing lines may be selected for connection to the source 28.

It will now be clear that if a light-responsive unit is illuminated in a selected position of row A and in a selected position of row B, the gang switch connected to the unit in the tens column will move to circuit closing position, but since only one of the relays 12 is capable of effecting energization of only one of the wires 16, then only one of the hundred of relays 24 is capable of energizing one of the hundred outgoing lines.

If an illuminated light-responsive unit is in the zero position of the tens column, then the gang switch shown at the top of the row of gang switches in Figure 1 will move to permit a signal to be sent through one of ten outgoing wires, depending upon the position of an illuminated unit in row A.

On the other hand, if an illuminated light-responsive unit is in the zero position in row A, then ten other outgoing wires are available to indicate that a signal is had from one of the illuminated units placed in row B.

With light-responsive units variously positioned, one in row A and one in row B, there are one hundred outgoing wires available to indicate a signal from any number combination from zero to 99.

It will now be obvious that there are ten bus bars each adapted to be energized by the illuminating of a light-responsive unit in row A individual to the bus bar, and a single line is selected out of ten groups of lines to carry a signal by being selected by one of a group of ten gang switches operable upon the illuminating of a selected unit of row B.

Each of the outgoing wires 27 may be connected through a switch 30 (Figure 2) to connect it to a wire 31 to actuate a relay 32 and close a circuit including a source of current 33, a film driving motor 35 of a film 66 in a conventional projection machine 58, and in which each film frame is momentarily arrested while the shutter moves to expose it, an armature 34, and a contact 36, and each outgoing wire 27 may also include in its circuit a gang switch 37, or other current-responsive means.

In each of the columns C, D, E, F, and G, respectively, there are ten sockets each adapted to receive a light-responsive unit 14 in any one of ten positions, but all of the sockets in each row are connected to a single relay through a switch 38.

The relays for the rows C, D, E, F, and G have been given the numerals 39, 40, 41, 42, and 43, respectively, and they are adapted to move armatures 44, 45, 46, 47, and 48, respectively, which are connected in series through a switch 49 to a battery 76, and are also connected to the wire 19 which is connected to all of the armatures 15 of the relays 12.

Switches 50, 51, 52, and 53 are closable to connect any of the armatures 44, 45, 46, and 47, respectively, to the battery 76 through a wire 55, and a switch 54 is available to connect the wire 19 direct to the battery 76 when rows A or B, or both A and B, are used without reference to rows C, D, E, F, and G.

It will now be apparent that when switch 54 is closed, and selected light-responsive units in rows A and B are illuminated, current will flow from the battery 76 through one of the relays 24 to make possible the connecting of one of the outgoing lines 27 to the battery 28 to operate a current-responsive device 37, individual to the outgoing line selected, and to operate also the relay 32 (Figure 2), if one of the switches 30 is closed.

It will also be apparent that by suitable manipulation of the switches 49, 50, 51, 52, and 53, with switch 54 open (Figure 1), a light unit in one of the sockets of the rows C, D, E, F, and G must be illuminated to close the relay individual to that row before the units in rows A and B are effective to cause a signal to be sent through a selected line 27.

In the operation of the illustrated switching system, or switchboard, it is contemplated that light-responsive units will be placed in all of the sockets in rows A and B to be swept by beams of light positioned to have numerical significance.

A movable film 66 (Figure 2) may be placed between a source of light and the units in rows A and B and conditioned as indicated at 67 (Figure 3) to permit beams of light of varying positions to sweep the units of rows A and B, so that the signals going out over the outgoing lines may be translated to repeat the data carried by the film.

The film may carry the record of business transactions of offices or agents, and the film is first passed through a projection machine to indicate the transactions of a certain agent or office, and again passed through the machine to indicate the transactions of another agent or office with a desired row of the rows C, D, E, F, and G arranged effective to permit the rows A and B to record only the transactions of the desired agent or office and to ignore the transactions of others recorded on the same film.

It is contemplated, as shown in Figure 2, that each of the outgoing lines 27 have in circuit therewith a relay or gang switch 37 with an armature movable to connect the illuminated light-responsive units 56 of a row H of such units to actuate current-responsive devices 57 incorporated in a recording or tabulating machine indicated generally at 75. It is contemplated that the light units 56 of the row H will be scanned by coded light beams from the film 66, as described in connection with rows A and B, while rows A and B are being scanned to translate the signal passing over the outgoing wires 27 in terms of the light units 56. Several current-responsive devices 37 may be connected in series or in parallel circuit connection with each outgoing wire 27 to each operate a gang switch, with each gang switch operably connected with a row of light-responsive units to selectively actuate selected current-responsive devices 57.

It is contemplated that light beams passing through a film, or other suitable matrix, will illuminate selected light-responsive units in the rows C, D, E, F, and G, the light beams being in coded position to identify the work record of a certain agent, for instance. Rows A and B will also be selectively illuminated by coded light beams to select from the work record certain types of transactions, and row H, or a plurality of such rows, will be used to cooperate with suitable means to record the cash value of items selected from the work record.

Similarly, the means illustrated may be utilized in connection with tabulating elements and groups of elements produced in production plants or expended from stock in stock-taking.

For a given use, the light-sensitive units in selected positions in rows A, B, C, D, E, F, and G would be steadily illuminated while moving light beams of coded positions scanned the light units in row H, or in as many of such rows H as are necessary, to embrace the data carried by the film.

The relays 12, 21, and 39 to 43 may be of the electronic type or of the holding-circuit magnetic type, and arranged so that a momentary illuminating of the selected light-responsive units in rows A to G is enough to cause the connecting of a line 27 to the source 28 until the desired data on the film has been noted by the light-responsive units in row H, and then are returned to their unitial open position by suitable means (not shown).

It is well known that electron relays of the arc type will maintain the plate circuit in closed position once the arc is formed and until some step is taken to extinguish the arc.

The current-responsive device or gang switch 37 may be maintained energized after a momentary illumination of the light-responsive units of the rows A to G by means indicated diagrammatically in Figure 2. In the circuit arrangement shown in Figure 2, current in the line 27 will actuate a relay 60 to move an armature 61 to close a holding circuit which includes the current-responsive device 37, a holding coil 62, a battery 63, and the armature 64 of a relay 65.

The relay 65 is in circuit with contacts of the gang switch 37 and a light-responsive unit 59, in a row J of light-responsive units, and illumination of the light-responsive unit 59 will result in the opening of the holding circuit and also the opening of the circuit of the motor 35. Thus, a coded light beam on the film may illuminate the light-responsive unit 59 at the end of a film run of desired data to indicate the end of the run.

The modification illustrated in connection with row J is for the purpose of illustrating one way of inserting means in a line 27 to hold the gang switch 37 energized until the light-responsive units have been scanned by moving beams of light. Electron tube means may be connected in circuit with the relays directly actuable by the light-responsive units in rows A to G to maintain a selected outgoing line 27 energized until the end of the recording or tabulating run, but the modification illustrated in connection with row J is easier to illustrate and avoids confusion of lines, and is not to be construed as a limitation.

Figure 4:
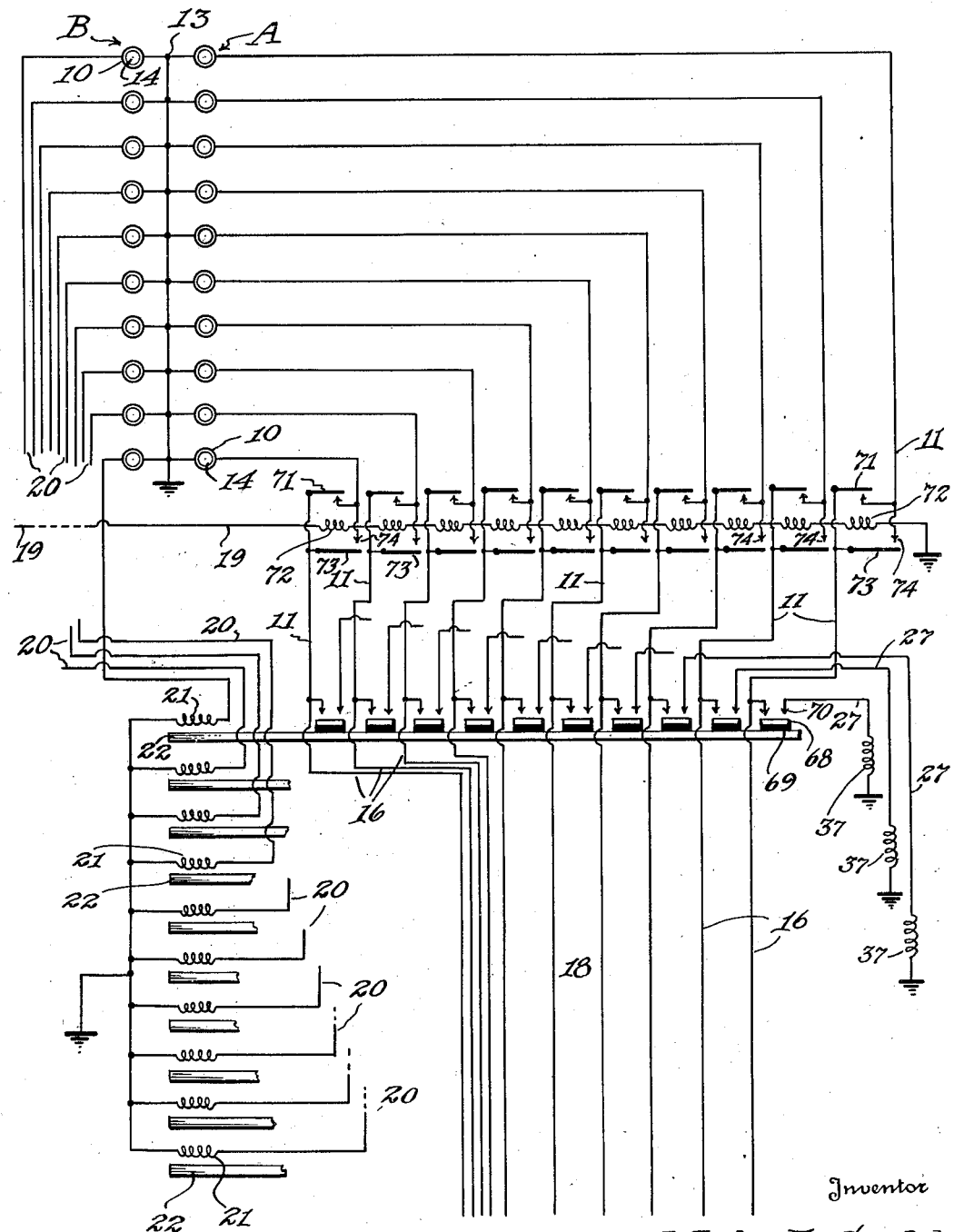
Figure 4 illustrates diagrammatically a portion of the circuits and instrumentalities of Figure 1, with modifications.

While the outgoing line 27 is shown in Figure 1 as energized by being connected to the battery 28 upon the connecting of an energized bus bar to ground through a relay 24 by movement of a gang switch 22, it will be obvious that current from the light-responsive units in row A may be sent directly through the line 27 to actuate a suitable current-responsive device directly or through conventional relay means of the electronic types, and as is illustrated in the modified circuit of Figure 4. It is well understood that many forms of conventional light-responsive deivces are available, to deliver current when their light-sensitive element is activated by light, or to function as switches or relays when a light-sensitive element is exposed to light.

The term "light" is used in its broadest sense, and the term "illuminate" is also used in its broadest sense, for it is now well known that devices popularly known as the electric eye are responsive to light frequencies outside the visible range.

In Figure 4, the armature 22 of the the gang switch 21 has been modified to show a metal contact 68 on insulation 69 to engage a pair of contacts 70 to connect the bus bar 16 directly to the outgoing line 27. The light-responsive unit 10 may be connected directly to the bus bar 16 by closing a switch 71 interposed in the wire 11, and with this switch 71 open, the light-responsive units in rows C, D, E, F, and G, and the switch 54 will still exercise the control already described fully by means of a relay 72 effecting control over an armature 73 and a contact 74 interposed in each wire 11.

With switch 71 or switch 54 closed, the rows A and B may be used without reference to the rows C, D, E, F, and G, but with switches 71 and 54 open, it will be necessary that a light-responsive unit in a selected position in a selected row be illuminated to effect closing of the circuit between the light-responsive units in row A and the bus bars 16 through the relays 72.

Referring to Figure 1, we have, in substance, what may be aptly termed, a line-finder or switchboard, one in which it is possible to cause the energization of any one of a hundred lines by simply activating, by light, selected light-sensitive units of twenty units. If we were to insert a battery in series with the wire 13, between the end of the wire and its connection to ground, it is obvious that if we substituted manually operable switches for the light-responsive switches shown in rows A and B, it would then be possible to energize any selected one of a hundred lines by a switchboard having only twenty manually operable switches when a selected pair of switches was closed.

Current flowing in a selected line 11 upon the closing of a switch in row A causes the closing of a relay 12 to energize a selected vertical bus bar 16 of ten available vertical bars. Current flowing in a selected line 20 upon the closing of a switch in row B will operate a selected gang switch 21 of ten available gang switches. Each gang switch may be provided with ten contacts, insulated from each other, and each connected to an outgoing line individual to each contact, and when a gang switch is closed, only one of its contacts would find itself in engagement with an energized vertical bus bar. An alternative, and easier to illustrate, is to employ gang switches having a single bar operable to engage the contacts of ten relays 24 so that the relay connected to the energized vertical bus bar will cause its armature 25 to engage its contact 26, and so energize a line 27 individually connected to that armature.

Thus, there are 100 outgoing lines, only one of which will be energized when one of the ten gang switches engages the contact 23 of one relay of a hundred relays 24 which happens to be energized by one of the ten available vertical bus bars.

The circuit of an energized outgoing line 27 embraces the battery 28, the relay contact 26, the armature 25, and the solenoid of the accumulator switch 37.

It is desirable, for certain purposes, to render the closing of switches in the rows A and B ineffective to energize an outgoing line unless a selected master switch is closed. Rows of switches C, D, E, F, and G are provided, and these switches may be inserted in series between the battery 76 and the line 19 which causes energization of the vertical bus bars 16 when a relay 12 is closed by a switch in row A. Thus, unless a selected master switch is closed, the closing of switches in rows A and B, either manually or by light, will not result in the selection of an outgoing line.

The film frame that carries spots to permit light beams to scan rows A and B to actuate the light-responsive switches also carries a spot to permit light to actuate a master switch in rows C, D, E, F, and G, and things may be arranged so that the spots indicating numerical values are ineffective to select an outgoing line unless the frame also has a spot in the proper position to actuate the master switch then in use.

Thus, the rows A and B will in effect ignore data not falling within a certain classification, which classification is determined by the position of the master switch.

Having selected one of the hundred outgoing lines by means of the light-responsive switches of rows A and B, we have also selected which one of a hundred solenoids 37 will be energized to move its switch to connect a row of ten light-responsive switches to a row of ten key-operating solenoids of a counter.

The film frame that carries spots to result in the actuating of the master switch and in the selection of an outgoing line also carries spots to permit the light-sensitive units 56 to be scanned by light to cause the solenoids 57 to transfer to the wheel of the counter the numerical values carried by the spots on the film.

Thus far, it has been shown that the film may have a spot in one row to activate the master switch, then spots in two other vertical rows to activate the line finder, and then spots in another row to indicate money values transferable to the wheel of the counter. Obviously, the film may carry other vertical rows of spots to indicate money values in ascending powers of ten, and thus, when a line 27 is selected, instead of actuating the switch 37 of only one counter, it may energize several such switches to make available several counters and their individual rows of light-sensitive devices to transfer to counters money values of cents, dimes, and dollars, for instance.

A film may have thousands of frames, each carrying the money values of transactions in different fields. It is obvious that the film may be run through the projector so that only the money values of a single transaction may be counted. On a second run through the machine, the money values of an entirely different transaction may be recorded.

If the transactions of one kind are on a selected portion of the film and on all of the frames in that portion, with other transactions on a succeeding portion, then it is a simple matter to arrange things so that a film frame marking the end of one transaction will carry a spot to result in actuation of a light-sensitive unit 59, placed in a suitable position, and cause stopping of the motor 35. The operator may then change the position of the master switch to take care of the other transaction when the film is again started.

It will now be clear that, in the arrangement illustrated, it is possible to scan a film carrying money values of a hundred different types of transactions in, say, the life insurance field, and to route these money values to a hundred different groups of adding machines. In the taking of an inventory, a hundred different things may have the quantities of each added on a hundred different adding machines, with the rows A and B automatically routing each item to the adding machine for that item.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In combination, a source of current, a plurality of bus bars, a plurality of signalling lines each provided with a line switch actuable by current in a bus bar, a light-responsive unit connected to each of said bus bars, and forming a first group of units disposed in coded position, means to selectively illuminate a unit of said group to effect connection of a bus bar individual to said unit to said source of current, a second group of light-responsive units disposed in coded position, each of said second units having a gang switch connected thereto and individual thereto, means to selectively illuminate a unit of said second group to effect movement of a gang switch individual to said unit and thereby effect movement of but one line switch by a bus bar energized because of the illuminating of a unit in said first group, a third group of light-responsive units interposed between said source of energy and said bus bars, and means to selectively illuminate the units of said third group to effect control of current flow from said source to said bus bars.

2. In combination, a plurality of bus bars, a plurality of signalling lines each provided with a line switch, a light-responsive unit connected to each of said bus bars and forming a first group of light-responsive units disposed in coded position, means to selectively illuminate a unit of said first group to effect energization of a bus bar individual to said unit, a second group of light-responsive units disposed in coded position, each of said second units having a gang switch connected thereto and individual thereto, and means to selectively illuminate a unit of said second group to effect movement of a gang switch individual to said unit to connect one of said lines to a bus bar energized by the illuminating of a unit in said first group.

3. In combination, a plurality of bus bars, a plurality of signalling lines each provided with a line switch, a light-responsive unit connected to each of said bus bars and forming a first group of light-responsive units in coded position, means to selectively illuminate a unit of said first group to effect energization of a bus bar individual to that unit, a second group of light-responsive units disposed in coded position, each of said second units having a gang switch connected thereto and individual thereto, means to selectively illuminate a unit of said second group to effect movement of a gang switch individual to said unit to connect one of said lines to a bus bar energized by the illuminating of a unit in said first group, and other light-responsive means in interposed circuit connection between said bus bars and said first group to control the energization of said bus bars by said first group.

4. In combination, a plurality of bus bars, a plurality of groups of signalling lines, the members of each group being connectable to a bus bar individual to that group, each of said signalling lines being provided with a line switch, a first group of light-responsive units having units selectively energizable to energize a bus bar individual to a unit and to a group of said lines, means to selectively illuminate a unit of said first group of light-responsive units, a second group of light-responsive units having units selectively energizable to energize a switch individual to that unit to effect connection of a selected signalling line to an energized bus bar, and a third light-responsive means connected with means interposed in series circuit connection with said bus bars to control energization of said bus bars, and means to selectively illuminate said third light-responsive means.

5. In combination, a current-responsive switch, means to control actuation of said switch, said means comprising a line switch connected with said current-responsive switch, a bus bar, a first light-responsive unit connected with said bus bar, means to illuminate said first light-responsive unit to effect energization of said bus bar, a second light-responsive unit, said line switch being connected with said second light-responsive unit, means to illuminate said second light-responsive unit to effect operation of said line switch and the connecting of said current-responsive switch with said bus bar, circuit holding means actuable upon momentary illuminating of one of said light-responsive units to maintain said current-responsive switch in closed position, a third light-responsive unit energizable to effect opening of said current-responsive switch, and means to illuminate said third light-responsive unit.

6. In combination, a plurality of signalling lines, means to select one of said lines at a time for energization, said means comprising a plurality of bus bars each connectable with a selected group of said lines, a first group of light-responsive switches in coded positions and adapted to be selectively illuminated to effect selected energization of one of said bus bars, a second group of light-responsive switches in coded positions and adapted to be selectively illuminated to connect one of said lines of a group to an energized bus bar, means to selectively illuminate said first and said second groups of light-responsive units, means to de-energize the selected energized line, said means comprising a light-responsive switch in circuit connection therewith and means to illuminate said last-mentioned light-responsive switch.

7. In combination, a plurality of signalling circuits each comprising an outgoing line and a return path, a source of current, means to connect a selected one of said plurality of lines at a time to said source of current while excluding the others of said lines, said means comprising a plurality of bus bars, a first group of light-responsive switches with each switch arranged operable to connect a bus bar individual to a switch to said source, a plurality of gang switches, a second group of light-responsive switches with each light-responsive switch of said second group arranged operable to connect a gang switch individual thereto to a plurality of bus bars and to a plurality of lines, and means to selectively illuminate said light-responsive switches.

8. In combination, a hundred signalling circuits each comprising a line and a return path, a source of current, means to connect a selected one of said hundred lines and its return path to said source of current while excluding the others of said hundred lines, said means comprising ten bus bars, a first group of ten light-responsive switches with each switch arranged operable to connect a bus bar individual to said switch to said source, ten gang switches, a second group of light-responsive switches with each light-responsive switch of said second group arranged operable to connect a gang switch individual thereto said ten bus bars and to ten of said hundred lines, and means to selectively illuminate a light-responsive unit in said first group of said light-responsive units and to selectively illuminate a light-responsive unit in said second group of light-responsive units.

9. In combination, a source of current, a plurality of signalling lines, means to connect a selected one of said plurality of lines and its return path at a time to said source of current while excluding the others of said plurality of lines, said means comprising a plurality of bus bars, a first group of light-responsive switches with each switch arranged operable to connect a bus bar individual thereto to said source, a plurality of gang switches, a second group of light-responsive switches, with each light-responsive switch of said second group arranged operable to operate a gang switch individual thereto to connect only a selected one line of said plurality of lines to a bus bar connected to said source, and means to selectively illuminate said light-responsive switches.

10. In combination, a plurality of signalling lines, a plurality of bus bars, a first group of light-responsive units disposed in coded position to each other and with each unit arranged connectible to a bus bar individual thereto, a plurality of gang switches, a second group of light-responsive units disposed in coded position to each other with each unit of said second group arranged connectible with a gang switch individual thereto for operation of the gang switch to connect a selected one line to a selected one bus bar, a source of light, a movable film disposed between said source of light and said first and said second groups of units, said film being formed whereby a first beam of light in coded position is operable to illuminate a unit in said first group of units, and whereby a second beam of light in coded position is operable to illuminate a unit in said second group of units.

MERLE E. GOULD.